(12) United States Patent
Chiang

(10) Patent No.: US 10,309,442 B2
(45) Date of Patent: Jun. 4, 2019

(54) TORSION DEVICE

(71) Applicant: FIRST DOME CORPORATION, New Taipei (TW)

(72) Inventor: I-Hung Chiang, New Taipei (TW)

(73) Assignee: FIRST DOME CORPORATION, New Taipei (TW)

(*) Notice: Subject to any disclaimer, the term of this patent is extended or adjusted under 35 U.S.C. 154(b) by 0 days.

(21) Appl. No.: 15/718,608

(22) Filed: Sep. 28, 2017

(65) Prior Publication Data

US 2019/0093698 A1   Mar. 28, 2019

(51) Int. Cl.
*E05D 11/08*   (2006.01)
*F16B 43/00*   (2006.01)

(52) U.S. Cl.
CPC ............ F16B 43/00 (2013.01); E05D 11/084 (2013.01); *E05D 2011/085* (2013.01)

(58) Field of Classification Search
CPC ... E05D 11/082; E05D 11/084; E05D 11/085; G05G 15/08; Y10T 16/54038; Y10T 16/547
See application file for complete search history.

(56) References Cited

U.S. PATENT DOCUMENTS

| | | | | |
|---|---|---|---|---|
| 5,697,125 A * | 12/1997 | Gannon | ............... | E05D 11/082 16/342 |
| 7,891,055 B1 * | 2/2011 | Combs | ................. | E05D 11/084 16/341 |
| 9,057,215 B1 * | 6/2015 | Horng | ....................... | E05D 3/12 |
| 9,206,633 B1 * | 12/2015 | Ju | ......................... | G06F 1/1681 |
| 2002/0144378 A1 * | 10/2002 | Liao | ...................... | G06F 1/1616 16/342 |
| 2010/0125976 A1 * | 5/2010 | Kuo | ..................... | G06F 1/1616 16/348 |
| 2011/0232032 A1 * | 9/2011 | Chu | ..................... | G06F 1/1681 16/221 |
| 2012/0204380 A1 * | 8/2012 | Chen | ..................... | E05D 11/082 16/342 |
| 2017/0138102 A1 * | 5/2017 | Chuang | .................... | E05D 3/06 |
| 2017/0183895 A1 * | 6/2017 | Chen | .................... | E05D 11/082 |
| 2018/0112447 A1 * | 4/2018 | Hatano | ................. | G06F 1/1681 |
| 2018/0239402 A1 * | 8/2018 | Wang | ................... | G06F 1/1681 |

* cited by examiner

*Primary Examiner* — Bradley T King
(74) *Attorney, Agent, or Firm* — Li & Cai Intellectual Property (USA) Office

(57) ABSTRACT

A torsion washer of the present disclosure includes a base portion and an elastic unit extended from the base portion. The elastic unit includes an external elastic arm and a torsion-adjusting arm arranged inside the external elastic arm. A space surrounded by the base portion and the external elastic arm is divided into a hole and a slot, in air communication with the hole, by using the torsion-adjusting arm. A distance, i.e., a radius, between the external elastic arm and a center of the hole is larger than a distance, i.e., an interference distance, between the torsion-adjusting arm and the center of the hole. Moreover, the present disclosure provides a torsion device including a plurality of the torsion washers and a shaft coupling through the holes of the torsion washers, and the shaft is configured to selectively contact each torsion-adjusting arm.

10 Claims, 13 Drawing Sheets

100

TORSION DEVICE

BACKGROUND OF THE INVENTION

1. Field of the Invention

The present disclosure relates to a torsion structure; in particular, to a torsion device and a torsion washer.

2. Description of Related Art

A conventional torsion washer does not have a structure which allows for receiving a lubricating oil, and provides only a torsion of fixed value, so that the conventional torsion washer cannot be applied to a device having different torque demands.

SUMMARY OF THE INVENTION

The present disclosure provides a torsion device and a torsion washer to solve the problem associated with conventional torsion washers.

The present disclosure provides a torsion device including a plurality of torsion washers and at least one shaft. The torsion washers are stacked in one row and each has a base portion and at least one elastic unit extended from the base portion. The at least one elastic unit of each of the torsion washers includes at least one external elastic arm and a torsion-adjusting arm. In the at least one elastic unit of each of the torsion washers, the torsion-adjusting arm is arranged inside of the at least one external elastic arm, and a space surrounded by the base portion and the at least one external elastic arm is divided by the torsion-adjusting arm into a hole and at least one slot in air-communication with the hole. In the at least one elastic unit of each of the torsion washers, the hole has a center; a distance between the center and the at least one external elastic arm is defined as a radius, and a distance between the center and the torsion-adjusting arm is defined as an interference distance and is smaller than the radius. The at least one shaft couples through the hole of each of the torsion washers and defines a central axis. An outer surface of the at least one shaft has a non-contact surface and a contact surface. A distance between the contact surface and the central axis is substantially equal to the radius, a distance between the non-contact surface and the central axis is smaller than the interference distance, and the contact surface of the at least one shaft contacts the at least one external elastic arm of each of the torsion washers and selectively contacts the torsion-adjusting arm of each of the torsion washers.

The present disclosure also provides a torsion washer including a base portion and at least one elastic unit. The at least one elastic unit is extended from the base portion. The at least one elastic unit includes at least one external elastic arm and a torsion-adjusting arm. The torsion-adjusting arm is arranged inside of the at least one external elastic arm. A space surrounded by the base portion and the at least one external elastic arm is divided by the torsion-adjusting arm into a hole and at least one slot in air-communication with the hole. The hole has a center, and a distance between the center and the at least one external elastic arm is defined as a radius. A distance between the center and the torsion-adjusting arm is defined as an interference distance and is smaller than the radius.

In summary, the torsion device of the present disclosure adapts the external elastic arm and the torsion-adjusting arm to cooperate with the corresponding shaft, so that the torsion device can provide torques of different values by rotating the shaft to different positions. Thus, the torsion device of the present disclosure can be applied to a device having different torque demands.

Moreover, since the torsion-adjusting arm provides a torque by cooperating with the shaft in an interference fit, the torsion-adjusting arm is easily deformed. Thus, each torsion washer is formed with a slot to receive a lubricating oil for reducing the friction between the torsion-adjusting arm and the shaft, thereby providing a stable torque of different values.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

References are hereunder made to the detailed descriptions and appended drawings in connection with the present disclosure. However, the appended drawings are merely provided for exemplary purposes, and should not be construed as restricting the scope of the present disclosure.

First Embodiment

Figure 1:
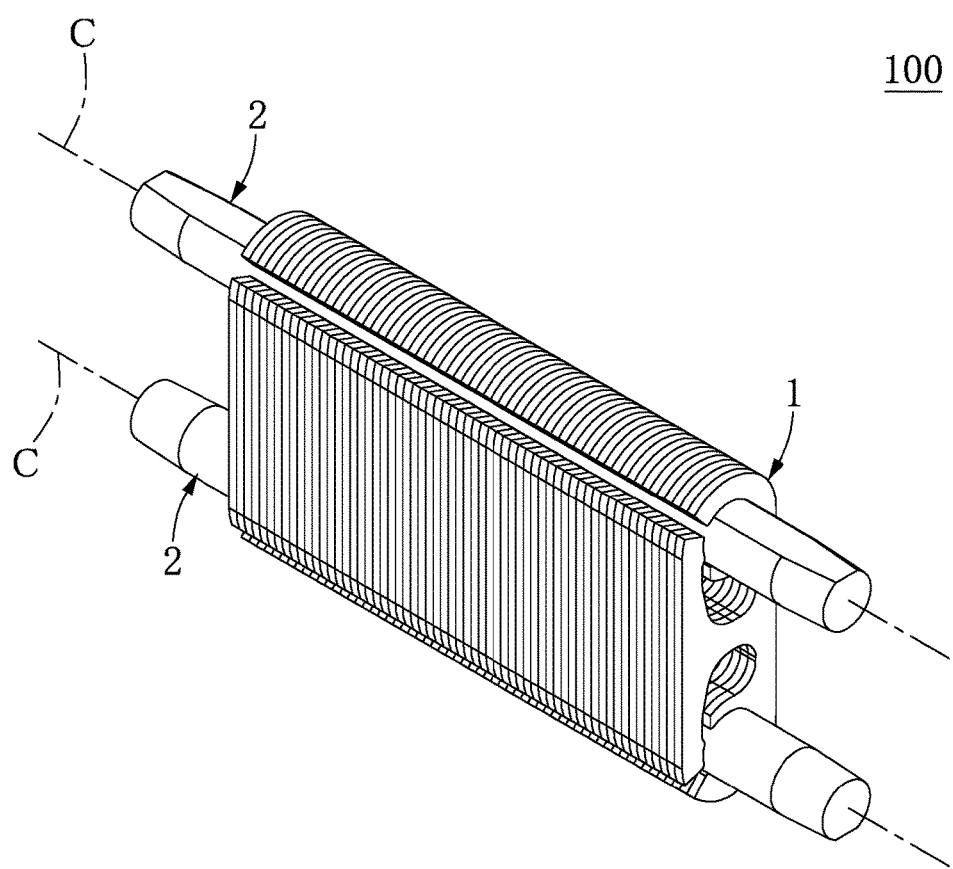
FIG. 1 is a perspective view showing a torsion device according to a first embodiment of the present disclosure.
Figure 2:
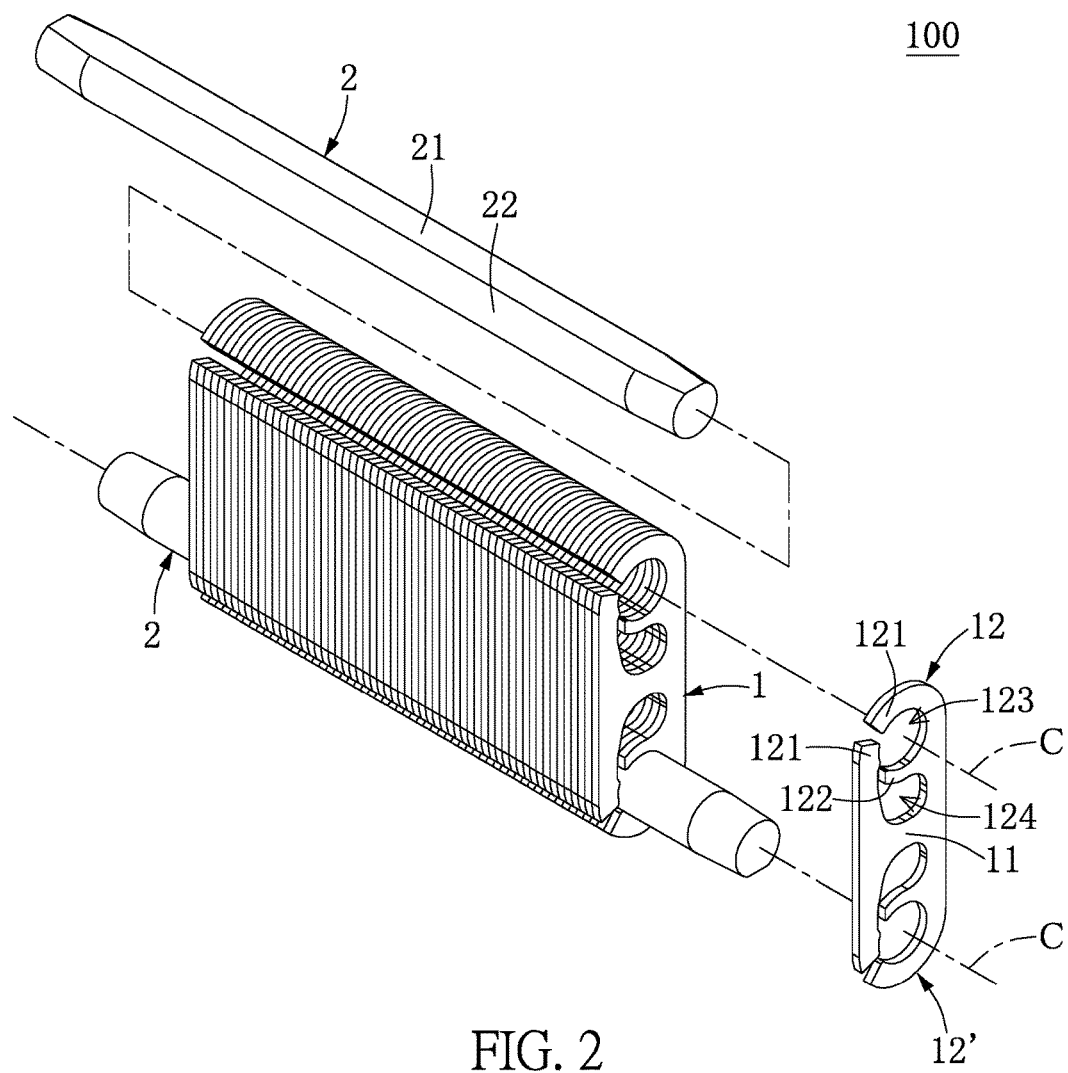
FIG. 2 is an exploded view of FIG. 1.

Reference is made to FIGS. 1 to 7, which illustrate a first embodiment of the present disclosure. As shown in FIGS. 1 and 2, the present embodiment discloses a torsion device 100 for being applied to different torque demands. For example, a touch-control screen of a notebook PC can be raised from a closed position by using a lower torque, but when the touch-control screen and the keyboard of the notebook PC have an angle within a range of 85-110 degrees, the touch-control screen needs to receive a higher torque for its touch-control function. The torsion device 100 includes a plurality of torsion washers 1 stacked in one row and two shafts 2 coupling through the stacked torsion washers 1, and the outer edges of the torsion washers 1 are flush with each other.

Specifically, each of the torsion washers 1 has a base portion 11 and two elastic units 12, 12' respectively extended from two opposite ends of the base portion 11. Each of the torsion washers 1 in the present embodiment is mirror symmetrical to the base portion 11 thereof, but the present disclosure is not limited thereto. However, in other embodiments of the present disclosure, the torsion washer 1 can be 2-fold symmetrical to the base portion 11. In addition, the two shafts 2 respectively couple through the two elastic units 12, 12' of each of the torsion washers 1.

It should be noted that while the torsion device 100 in the present embodiment is exemplified as that shown FIG. 2, the present disclosure is not limited thereto. In other embodiments of the present disclosure, the torsion device 100 can include a plurality of torsion washers 1 each provided without the elastic unit 12' and only one shaft 2 coupling through the torsion washers 1, or each of the torsion washers 1 of the torsion device 100 can be unsymmetrical to the base portion 11.

Moreover, as the torsion washers 1 in the present embodiment are of the same structure, each torsion washer 1 is symmetrical to the base portion 11, and the two shafts 2 are the same or symmetrical in structure. The following description discloses only the structure of the base portion 11 and the elastic unit 12 of one of the torsion washers 1 and the structure of the corresponding shaft 2 for the sake of brevity.

Figure 3:
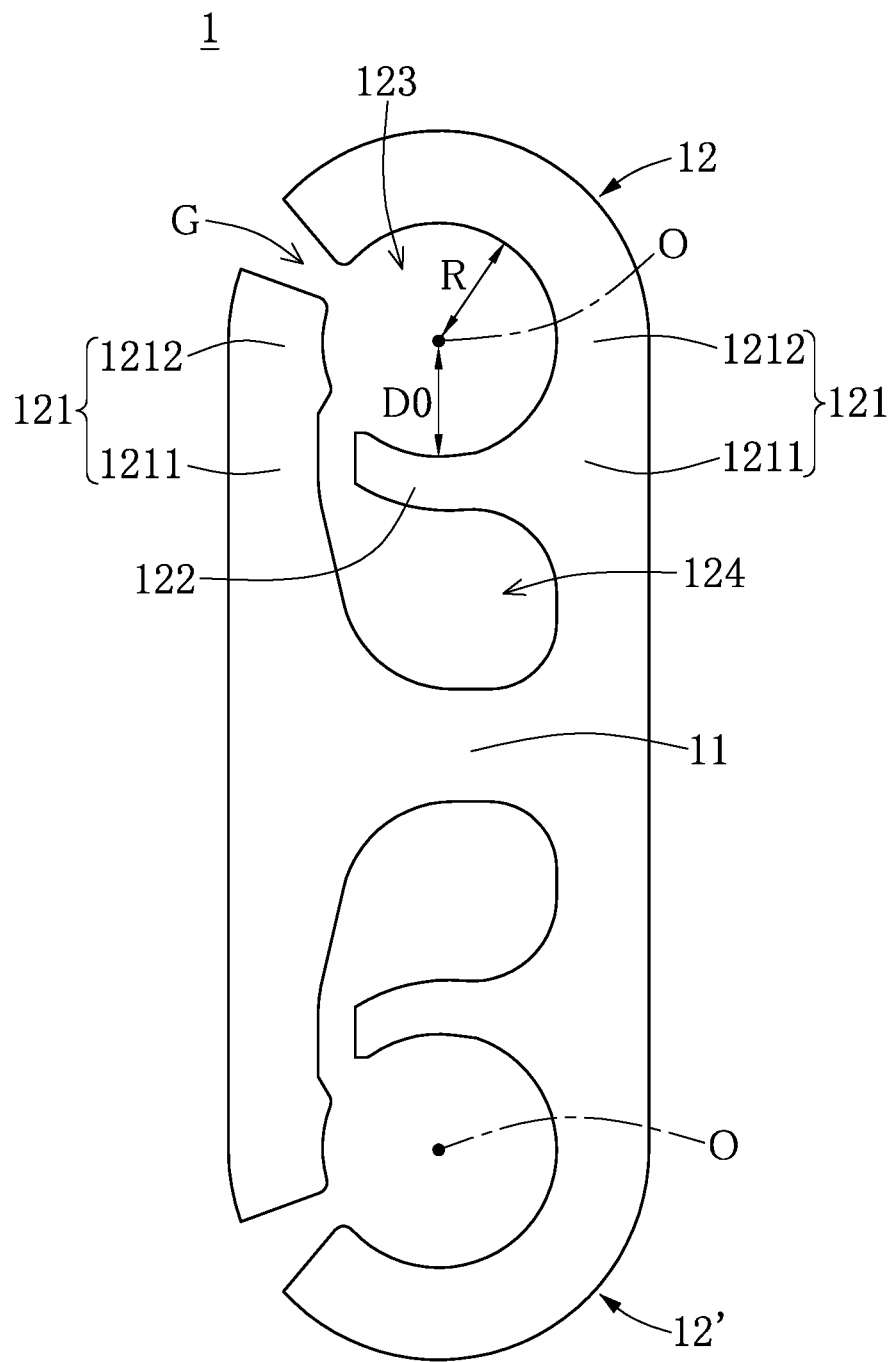
FIG. 3 is a planar view showing the torsion washer of FIG. 2.
Figure 4:
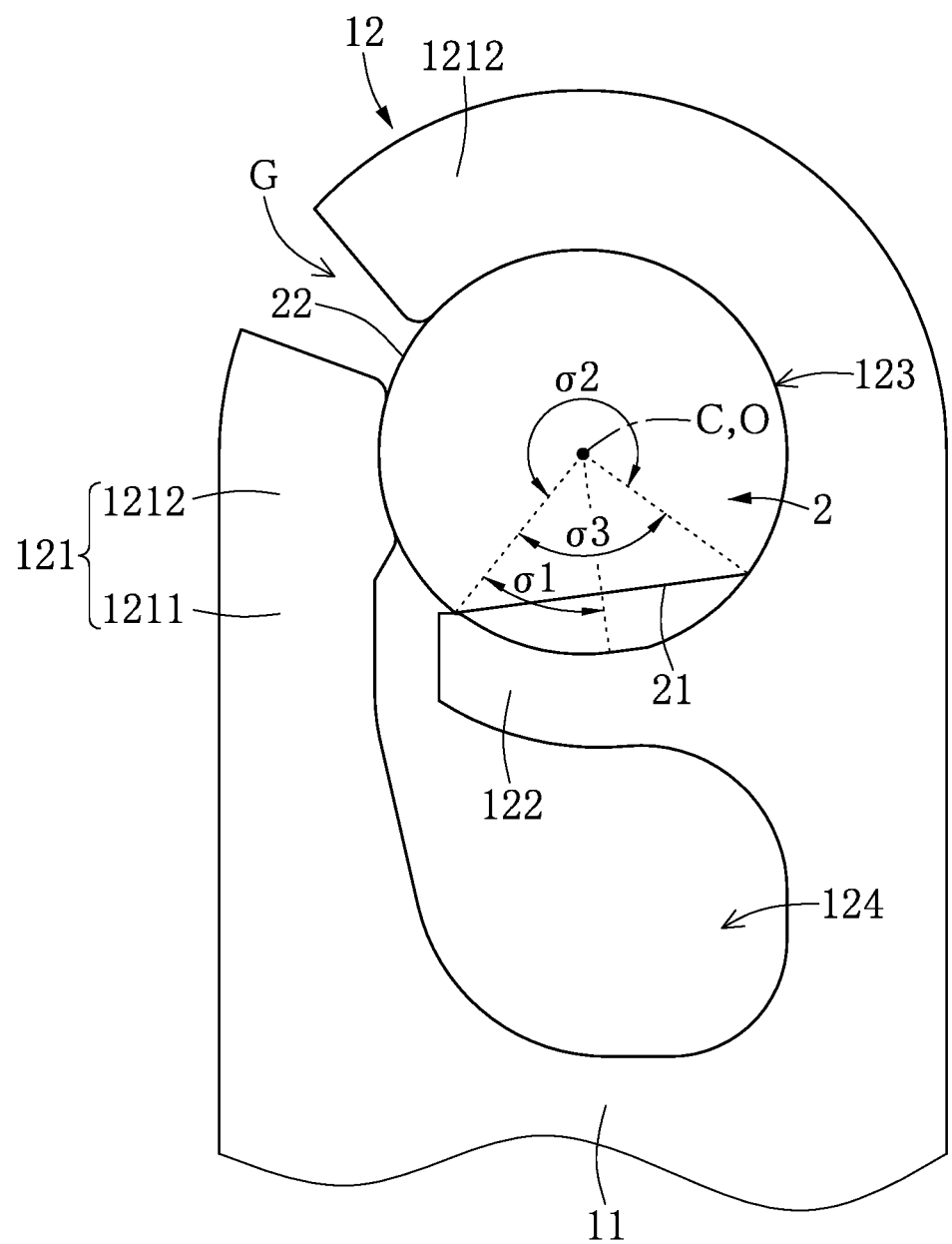
FIG. 4 is a planar view showing a first position of the torsion device of FIG. 1.

As shown in FIGS. 3 and 4, the elastic arm 12 includes two external elastic arms 121 and a torsion-adjusting arm 122. The two external elastic arms 121 in the present embodiment have different lengths, one end of the two external elastic arms 121 is connected to the base portion 11, and the other end of the two external elastic arms 121 (i.e., the free end of the external elastic arms 121 as shown in FIG. 3) has a gap G. Specifically, each of the external elastic arms 121 has an extending segment 1211 perpendicularly extended from the base portion 11 and an abutting segment 1212 extended from the extending segment 1211. The two extending segments 1211 are respectively connected to two opposite portions of the top edge of the base portion 11. In other embodiments of the present disclosure, the two external elastic arms 121 can have the same length, or the elastic unit 12 can be provided with only one external elastic arm 121.

The torsion-adjusting arm 122 is arranged inside of the external elastic arms 121, and the torsion-adjusting arm 122 in the present embodiment is substantially and perpendicularly connected to the inner edge of the longer external elastic arm 121. The torsion-adjusting arm 122 is extended from the abutting segment 1212 of the longer external elastic arm 121 toward a junction portion of the extending segment 1211 and the abutting segment 1212 of the shorter external elastic arm 121. A space surrounded by the base portion 11 and the two external elastic arms 121 is divided by the torsion-adjusting arm 122 into a hole 123 and a slot 124 in air-communication with the hole 123. The hole 123 and the slot 124 are respectively located at two opposite sides of the torsion-adjusting arm 122. The abutting segments 1212 of the two external elastic arms 121 and the torsion-adjusting arm 122 surroundingly co-define the hole 123, and the extending segments 1211 of the two external elastic arms 121, the torsion-adjusting arm 122, and the base portion 11 surroundingly co-define the slot 124.

Specifically, an inner edge of the abutting segment 1212 of each of the two external elastic arms 121 is substantially in an arc shape, and an inner edge of the torsion-adjusting arm 122 is also substantially in an arc shape, so that the hole 123 is substantially in a circle shape and has a center O. A distance between the center O and each of the external elastic arms 121 is defined as a radius R. A distance between the center O and the torsion-adjusting arm 122 is defined as an interference distance D0 and is smaller than the radius R. The interference distance D0 is preferably 90-98% of the radius R, but the present disclosure is not limited thereto. Moreover, the torsion-adjusting arm 122 has a first central angle corresponding to the center O of the hole 123, and the first central angle has σ1 degrees. The gap G has a central angle corresponding to the center O, and the central angle of the gap G is preferably smaller than or equal to 30 degrees.

In addition, the position and the structure of the torsion-adjusting arm 122 can be adjusted according to practical needs, and is not limited to that shown in FIG. 3. For example, in other embodiments of the present disclosure, a space surrounded by the base portion 11 and the two external elastic arms 121 can be divided by the torsion-adjusting arm 122 into a hole 123 and two slots 124 in air-communication with the hole 123. The two slots 124 are located at two opposite sides of the torsion-adjusting arm 122, and a part of the hole 123 is defined by a free end of the torsion-adjusting arm 122.

Figure 5:
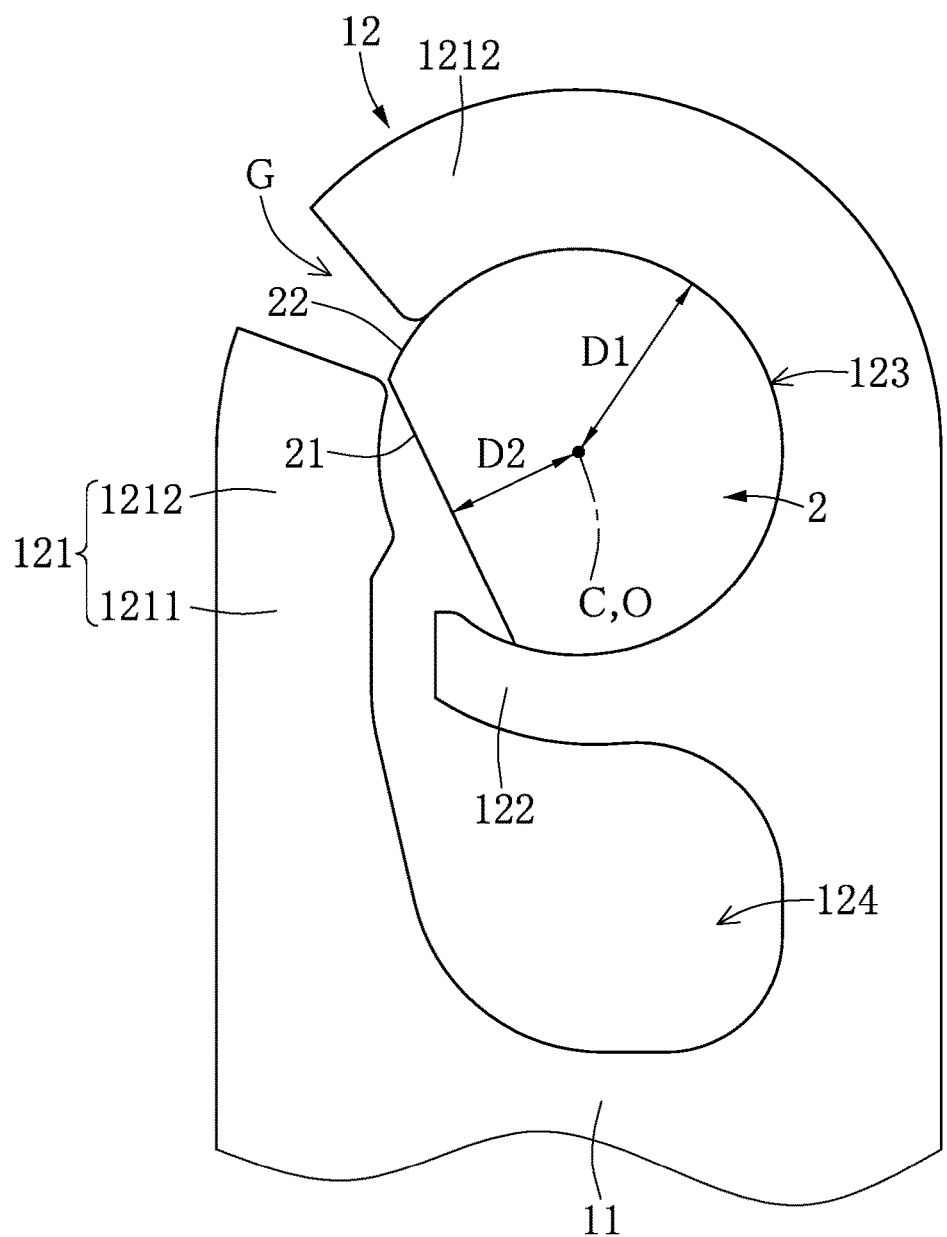
FIG. 5 is a planar view showing a transition position of the torsion device of FIG. 1.

As shown in FIGS. 3 to 5, the shaft 2 defines a central axis C, and an outer surface of the shaft 2 has a non-contact surface 21 and an arc-shaped contact surface 22. A distance D1 between the contact surface 22 and the central axis C is substantially equal to the radius R, and a distance D2 between the non-contact surface 21 and the central axis C is smaller than the interference distance D0. The non-contact surface 21 in the present embodiment is a flat surface parallel to the central axis C and formed by cutting the shaft 2, but the present disclosure is not limited thereto.

The contact surface 22 has a second central angle corresponding to the central axis C, and the second central angle has σ2 degrees. The non-contact surface 21 has a third central angle corresponding to the central axis C, and the third central angle has σ3 degrees. Moreover, σ2+σ3=360. In the present embodiment, the second central angle of the contact surface 22 is preferably larger than the third central angle of the non-contact surface 23 (i.e., σ3<σ2), but the present disclosure is not limited thereto.

The shaft 2 couples through the hole 123 of the elastic unit 12 of each of the torsion washers 1, and the central axis C of the shaft 2 in the present embodiment preferably overlaps the centers O of the torsion washers 1, so that the contact surface 22 of the shaft 2 contacts the external elastic arms 121 of each of the torsion washers 1 and selectively contacts the torsion-adjusting arm 122 of each of the torsion washers 1. It should be noted that the first central angle of the torsion-adjusting arm 122 is smaller than the second central angle of the contact surface 22 of the shaft 2 (i.e., σ<σ2), and the first central angle of the torsion-adjusting arm 122 is also smaller than the third central angle of the non-contact surface 21 of the shaft 2 (i.e., σ1<σ3).

Figure 6:
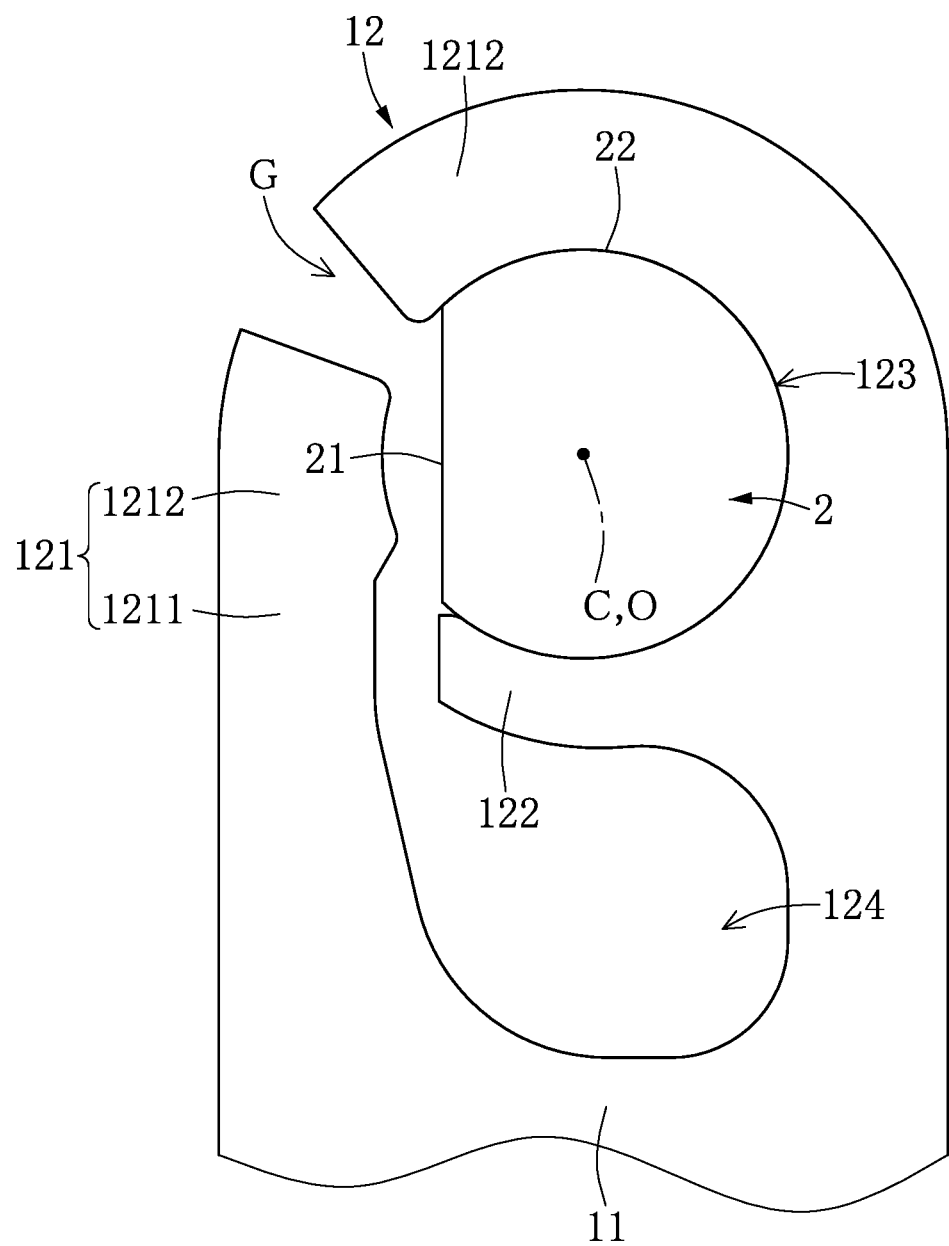
FIG. 6 is a planar view showing a second position of the torsion device of FIG. 1.
Figure 7:
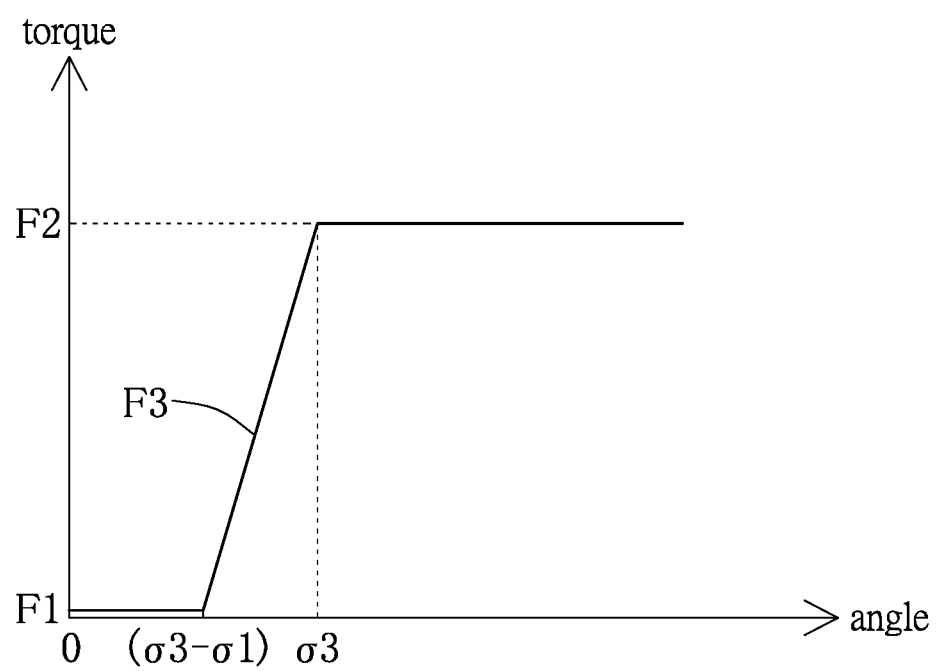
FIG. 7 is a simulation diagram showing the torque generated from the torsion device of FIG. 1 when in operation.

Specifically, the shaft 2 is rotatable relative to the torsion washers 1 along the central axis C from a first position (as shown in FIG. 4) to a second position (as shown in FIG. 6) via a transition position (as shown in FIG. 5). That is to say, the rotating direction of the shaft 2 is exemplified as a clockwise direction as shown in FIGS. 4 to 6. As shown in FIGS. 4 and 7, when the shaft 2 is in the first position, the torsion-adjusting arm 122 of each of the torsion washers 1 does not contact the shaft 2 (that is to say, each torsion-adjusting arm 122 faces the non-contact surface 21), and each of the torsion washers 1 generates a first torque F1 by using the contact surface 22 to rub with the external elastic arms 122. As shown in FIGS. 5 and 7, when the shaft 2 is in the transition position, the torsion-adjusting arm 122 of each of the torsion washers 1 partially contacts the contact surface 22 of the shaft 2, and each of the torsion washers 1 generates a gradually rising torque F3 by using the contact surface 22 to rub with the external elastic arms 122 and a part of the torsion-adjusting arm 122. As shown in FIGS. 6 and 7, when the shaft 2 is in the second position, the torsion-adjusting arm 122 of each of the torsion washers 1 entirely contacts the contact surface 22 of the shaft 2, and each of the torsion washers 1 generates a second torque F2 by using the contact surface 22 to rub with the external elastic arms 122 and the torsion-adjusting arm 122. Moreover, the second torque F2 is larger than the first torque F1, and the gradually rising torque F2 has a range that gradually increases from the first torque F1 to the second torque F2.

In other words, for the shaft 2 and the corresponding elastic unit 12 of each of the torsion washers 1, when the shaft 2 is in the first position (as shown in FIG. 4), a part of the non-contact surface 21 (i.e. the left part of the non-contact surface 21 as shown in FIG. 4) faces the torsion-adjusting arm 122, and the other part of the non-contact surface (i.e. the right part of the non-contact surface 21 as shown in FIG. 4) has a central angle corresponding to the central axis C and having σ3-σ1 degrees. When the shaft 2 is in the transition position (as shown in FIG. 5), the shaft 2 is rotated from the first position until rotating an angle within a range of σ3-σ1 degrees to σ3 degrees. When the shaft 2 is in the second position (as shown in FIG. 6), the shaft 2 is rotated from the first position until rotating an angle, which is more than σ3 degrees.

In summary, the torsion device 100 of the present disclosure adapts the external elastic arms 121 and the torsion-adjusting arm 122 of each torsion washer 1 to cooperate with the corresponding shaft 2, so that the torsion device 100 can provide torques of different values as the shaft 2 moves to different positions with respect to the torsion washers 1. Thus, the torsion device 100 of the present disclosure can be applied to a device having different torque demands. For example, when the torsion device 100 is applied to connect a touch-control screen and a keyboard of a notebook PC, the touch-control screen can be raised from a closed position by using a lower torque (e.g., the first torque F1) from one hand, and the torsion device 100 can provide a higher torque (e.g., the second torque F2) for supporting the touch-control function of touch-control screen when the touch-control screen and the keyboard have an angle within a range of 85-110 degrees.

Moreover, since the torsion-adjusting arm 122 of each torsion washer 1 provides a torque by cooperating with the shaft 2 in an interference fit, the torsion-adjusting arm 122 of each torsion washer 1 is easily deformed. Thus, each torsion washer 1 is formed with the slot 124 to receive a lubricating oil for reducing the friction between the torsion-adjusting arm 122 of each torsion washer 1 and the shaft 2, thereby providing a stable torque in different values.

In addition, the second position of the torsion device 100 can be determined by adjusting the third central angle (σ3) of the non-contact surface 21 of the shaft 2, so that a designer can adjust the third central angle (σ3) of the shaft 2 to quickly and precisely achieve the positional design for high torque demands in different products.

Second Embodiment

Figure 8:
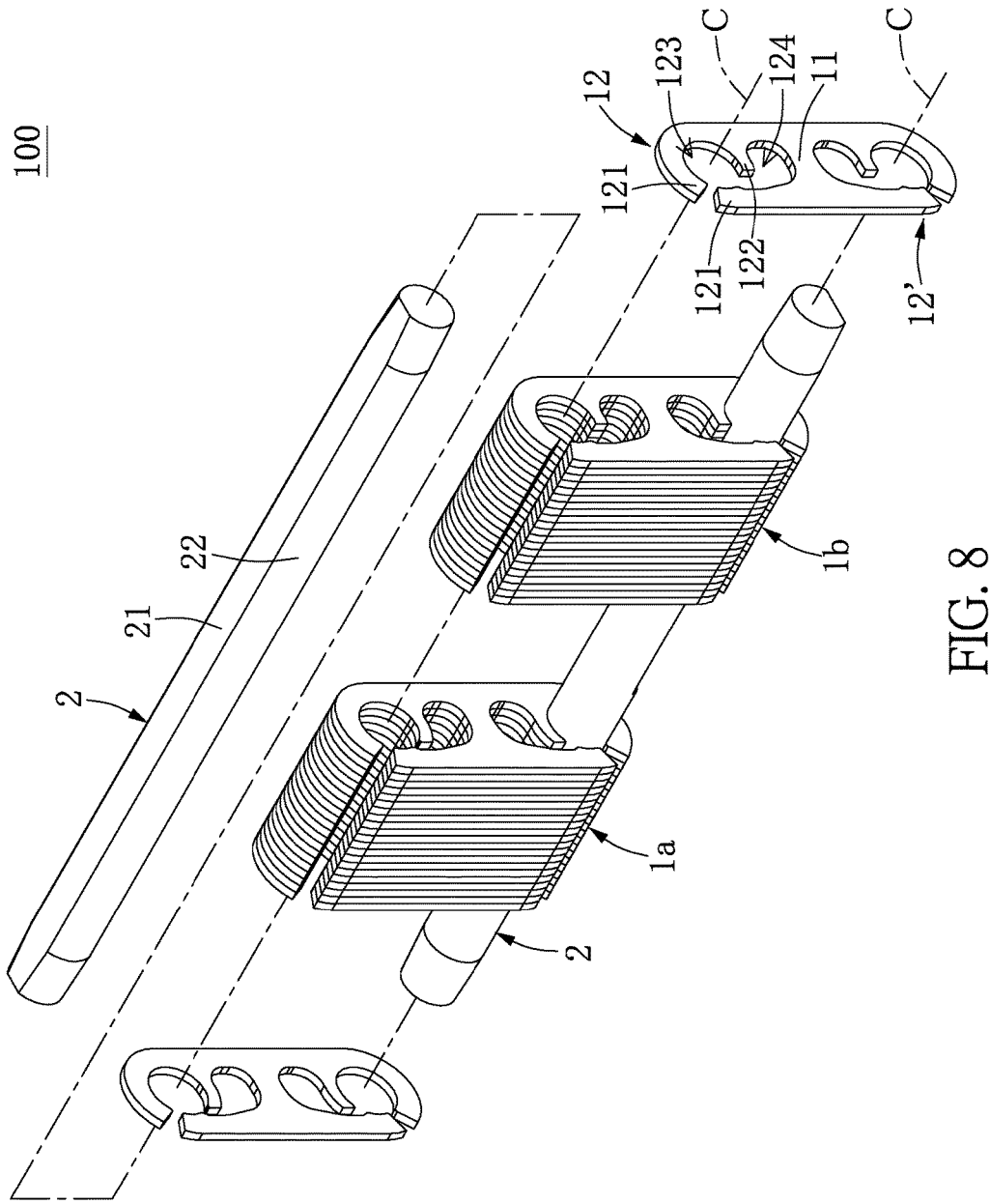
FIG. 8 is a perspective view showing the torsion device according to a second embodiment of the present disclosure.
Figure 9:
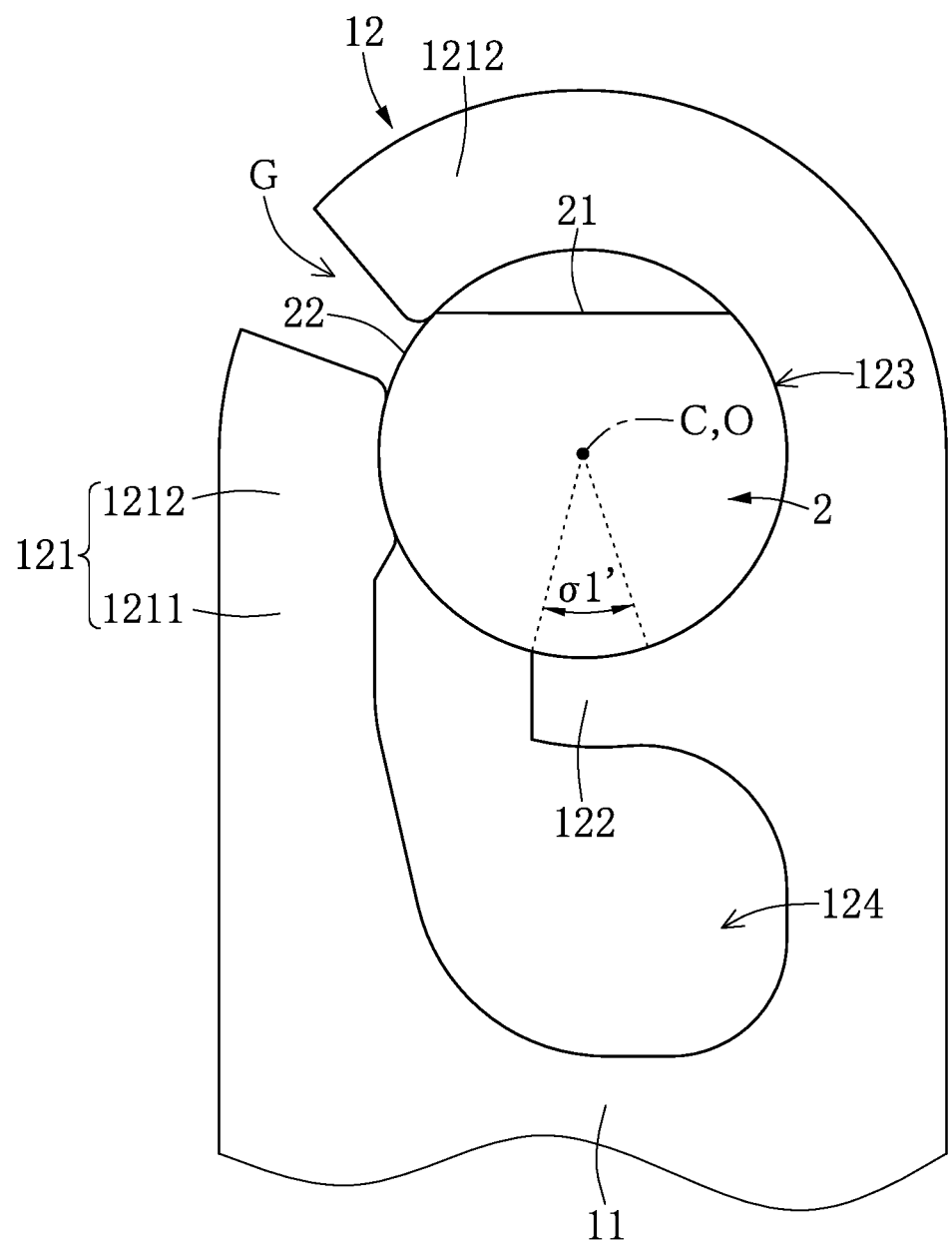
FIG. 9 is a planar view showing the torsion washer and the shaft of FIG. 8.

Reference is made to FIGS. 8 and 9, which illustrate a second embodiment of the present disclosure. The second embodiment is similar to the first embodiment, and the difference between the second embodiment and the first embodiment is that the torsion washers 1 of the present embodiment do not have the same structure.

Specifically, the torsion washers 1 of the present embodiment include a plurality of first torsion washers 1a and a plurality of second torsion washers 1b. Each of the first torsion washers 1a can be substantially identical to the torsion washer 1 as shown in FIGS. 3 and 4, and each of the second torsion washers 1b can be formed as shown in FIG. 9. Moreover, a central angle (σ1) of the torsion-adjusting arm 122 of each of the first torsion washers 1a is different from a central angle (σ1') of the torsion-adjusting arm 122 of each of the second torsion washers 1b. Thus, the torsion device 100 of the present embodiment can provide torque having more than three different values by using the shaft 2 to cooperate with the first torsion washers 1a and the second torsion washers 1b.

Third Embodiment

Reference is made to FIGS. 10 to 13, which illustrate a third embodiment of the present disclosure. The third embodiment is similar to the first embodiment, and the difference between the third embodiment and the first embodiment is the structure of the shaft 2.

Figure 10:
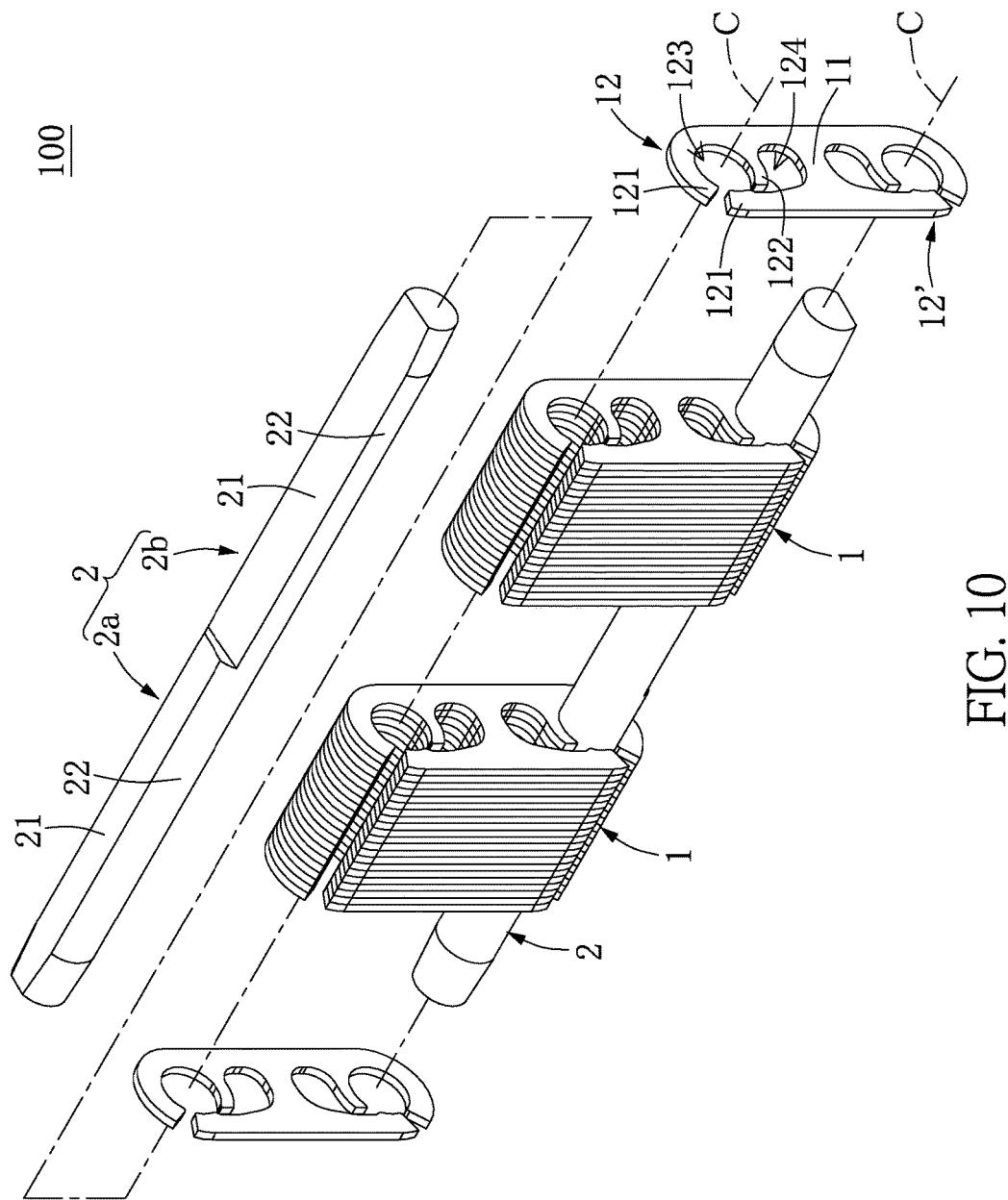
FIG. 10 is a perspective view showing the torsion device according to a third embodiment of the present disclosure.
Figure 11:
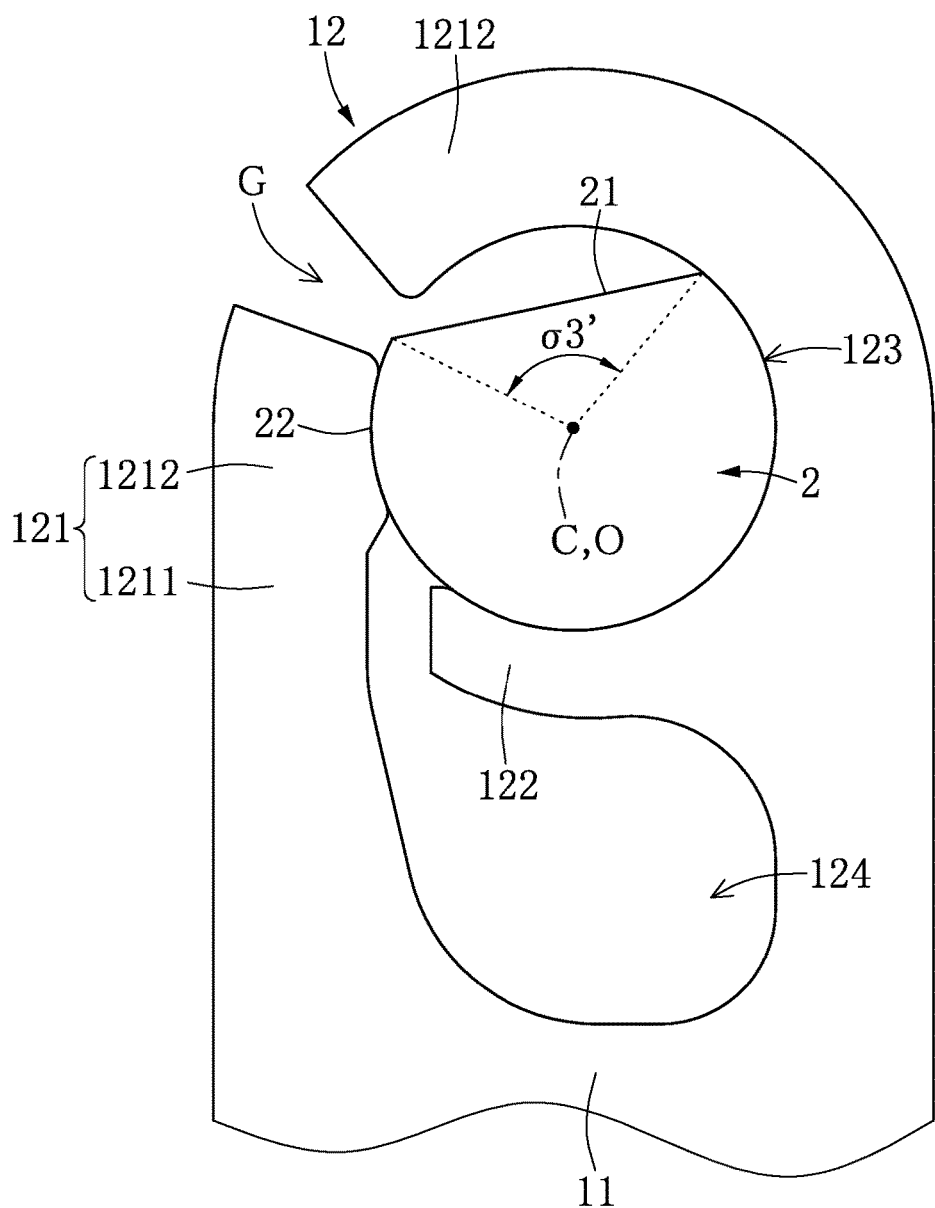
FIG. 11 is a planar view showing the torsion washer and a second segment of the shaft of FIG. 10.
Figure 12:
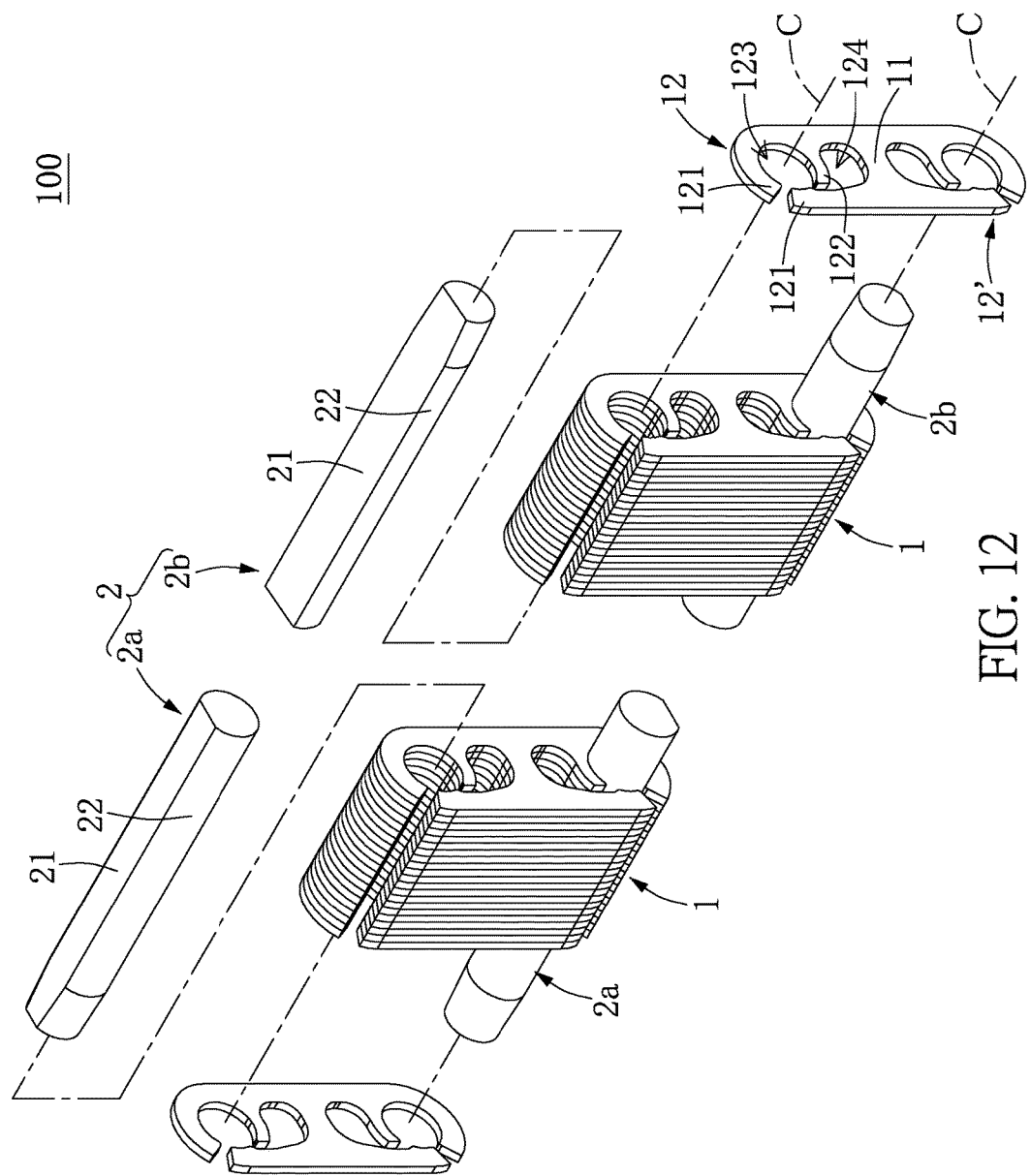
FIG. 12 is a perspective view showing the torsion device in another structure according to the third embodiment of the present disclosure.
Figure 13:
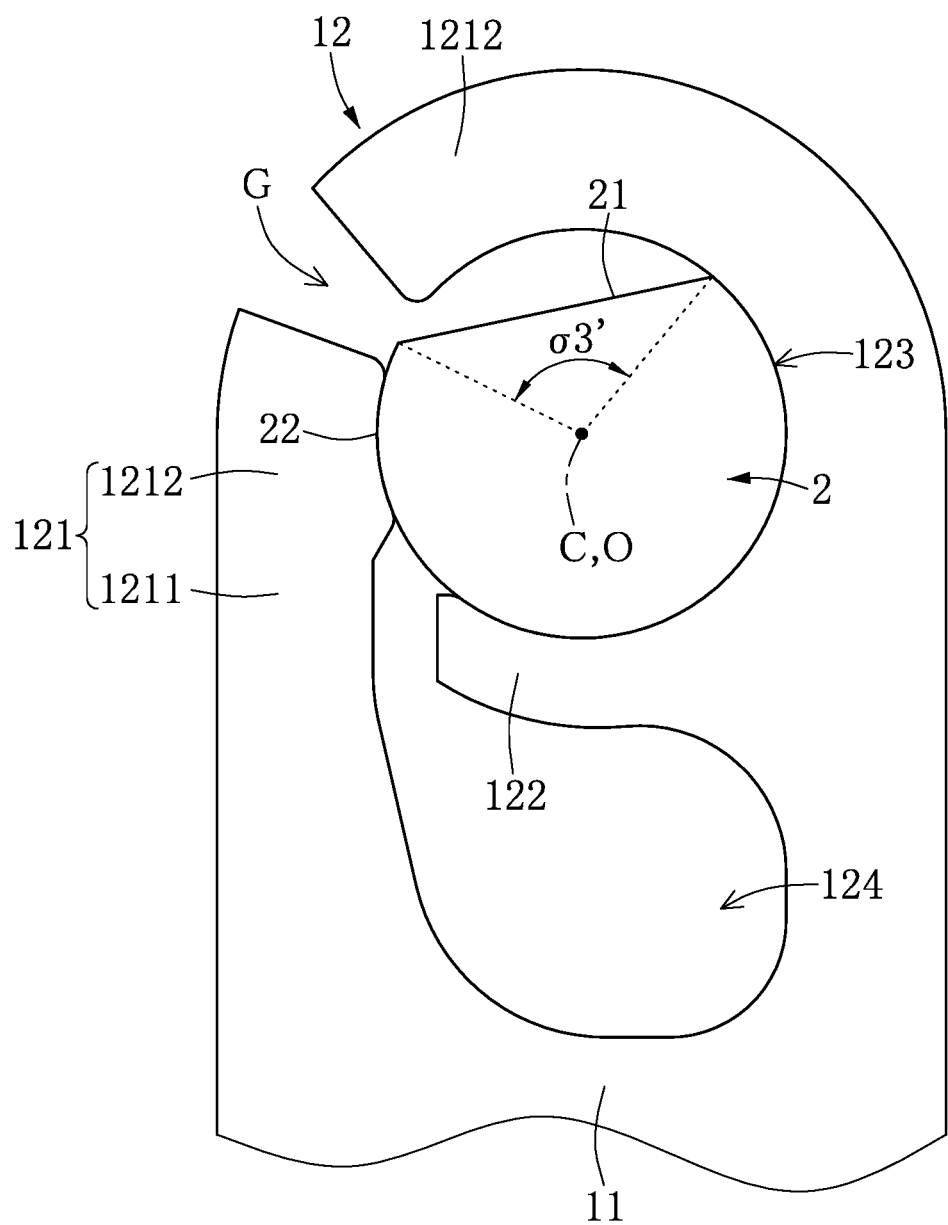
FIG. 13 is a planar view showing the torsion washer and the second segment of the shaft of FIG. 12.

Specifically, the shaft 2 includes a first segment 2a and a second segment 2b, and the first segment 2a and the second segment 2b can be integrally formed as one piece (as shown in FIG. 10) or be two separate pieces (as shown in FIG. 12). The first segment 2a couples through a part of the torsion washers 1, and the second segment 2b couples through the other part of the torsion washers 1. Moreover, the first segment 2a can be substantially identical to the shaft 2 as shown in FIG. 4, and the second segment 2b can be formed as shown in FIG. 11 or 13. In the present embodiment, a central angle (σ3) of the non-contact surface 21 of the first segment 2a is different from a central angle (σ3') of the non-contact surface 21 of the second segment 2b. Thus, the torsion device 100 of the present embodiment can provide torque having more than three different values by using the first segment 2a and the second segment 2b of the shaft 2 to cooperate with the corresponding torsion washers 1.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A torsion device, comprising:
a plurality of torsion washers stacked in one row and each having a base portion and at least one elastic unit extended from the base portion, the at least one elastic unit of each of the torsion washers including:
at least one external elastic arm; a torsion-adjusting arm arranged inside of the at least one external elastic arm, wherein a space surrounded by the base portion and the at least one external elastic arm is divided by the torsion-adjusting arm into a hole and at least one slot in air-communication with the hole, and wherein the hole has a center, a distance between the center and the at least one external elastic arm is defined as a radius, and a distance between the center and the torsion-adjusting arm is defined as an interference distance and is smaller than the radius; and at least one shaft coupling through the hole of each of the torsion washers and defining a central axis, wherein an outer surface of the at least one shaft has a non-contact surface and a contact surface, a distance between the contact surface and the central axis is substantially equal to the radius, a distance between the non-contact surface and the central axis is smaller than the interference distance, and the contact surface of the at least one shaft contacts the at least one external elastic arm of each of the torsion washers and selectively contacts the torsion-adjusting arm of each of the torsion washers, wherein the torsion washers include a plurality of first torsion washers and a plurality of second torsion washers, and a central angle of the torsion-adjusting of the first torsion washers is different from that of each of the second torsion washers.

2. The torsion device as claimed in claim 1, wherein in each of the torsion washers, the torsion-adjusting arm has a first central angle corresponding to the center of the hole and having σ1 degrees, wherein the contact surface has a second central angle corresponding to the central axis and having σ2 degrees, and the non-contact surface has a third central angle corresponding to the central axis and having σ3 degrees, and wherein σ2+σ3=360, σ1<σ2, and σ1<σ3.

3. The torsion device as claimed in claim 2, wherein the at least one shaft is rotatable relative to the torsion washers along the central axis from a first position to a second position via a transition position, wherein when the at least one shaft is in the first position, the torsion-adjusting arm of each of the torsion washers does not contact the at least one shaft, and each of the torsion washers generates a first torque, wherein when the at least one shaft is in the transition position, the torsion-adjusting arm of each of the torsion washers partially contacts the contact surface of the at least one shaft, and each of the torsion washers generates a gradually rising torque, and wherein when the at least one shaft is in the second position, the torsion-adjusting arm of each of the torsion washers entirely contacts the contact surface of the at least one shaft, and each of the torsion washers generates a second torque larger than the first torque.

4. The torsion device as claimed in claim 3, wherein in the at least one shaft and each of the torsion washers, when the at least one shaft is in the first position, a part of the non-contact surface faces the torsion-adjusting arm and the other part of the non-contact surface has a central angle corresponding to the central axis and having σ3-σ1 degrees, and when the at least one shaft is in the transition position, the at least one shaft is rotated from the first position to an angle within a range of σ3-σ1 degrees to σ3 degrees.

5. The torsion device as claimed in claim 3, wherein the gradually rising torque has a range that gradually increases from the first torque to the second torque.

6. The torsion device as claimed in claim 1, wherein the at least one shaft includes a first segment and a second segment, the first segment couples through a part of the torsion washers, the second segment couples through the other part of the torsion washers, and a central angle of the non-contact surface of the first segment is different from that of the second segment.

7. The torsion device as claimed in claim 6, wherein the first segment is arranged apart from the second segment.

8. The torsion device as claimed in claim 1, wherein the number of the at least one elastic unit of each of the torsion washers is two, and each of the torsion washers is symmetrical to the base portion thereof, and wherein the number of the at least one shaft of the torsion device is two, and the two shafts respectively couple through the two elastic units of each of the torsion washers.

9. A torsion device, comprising:

a plurality of torsion washers stacked in one row and each having a base portion and at least one elastic unit extended from the base portion, the at least one elastic unit of each of the torsion washers including:

at least one external elastic arm; a torsion-adjusting arm arranged inside of the at least one external elastic arm, wherein a space surrounded by the base portion and the at least one external elastic arm is divided by the torsion-adjusting arm into a hole and at least one slot in air-communication with the hole, and wherein the hole has a center, a distance between the center and the at least one external elastic arm is defined as a radius, and a distance between the center and the torsion-adjusting arm is defined as an interference distance and is smaller than the radius; and at least one shaft coupling through the hole of each of the torsion washers and defining a central axis, wherein an outer surface of the at least one shaft has a non-contact surface and a contact surface, a distance between the contact surface and the central axis is substantially equal to the radius, a distance between the non-contact surface and the central axis is smaller than the interference distance, and the contact surface of the at least one shaft contacts the at least one external elastic arm of each of the torsion washers and selectively contacts the torsion-adjusting arm of each of the torsion washers, wherein in each of the torsion washers, the torsion-adjusting arm has a first central angle corresponding to the center of the hole and having σ1 degrees, wherein the contact surface has a second central angle corresponding to the central axis and having σ2 degrees, and the non-contact surface has a third central angle corresponding to the central axis and having σ3 degrees, and wherein σ2+σ3=360, σ1<σ2, and σ1<σ3; and wherein the at least one shaft is rotatable relative to the torsion washers along the central axis from a first position to a second position via a transition position, wherein when the at least one shaft is in the first position, the torsion-adjusting arm of each of the torsion washers does not contact the at least one shaft, and each of the torsion washers generates a first torque, wherein when the at least one shaft is in the transition position, the torsion-adjusting arm of each of the torsion washers partially contacts the contact surface of the at least one shaft, and each of the torsion washers generates a gradually rising torque, and wherein when the at least one shaft is in the second position, the torsion-adjusting arm of each of the torsion washers entirely contacts the contact surface of the at least one shaft, and each of the torsion washers generates a second torque larger than the first torque.

10. A torsion device, comprising:
a plurality of torsion washers stacked in one row and each having a base portion and at least one elastic unit extended from the base portion, the at least one elastic unit of each of the torsion washers including:
at least one external elastic arm; a torsion-adjusting arm arranged inside of the at least one external elastic arm, wherein a space surrounded by the base portion and the at least one external elastic arm is divided by the torsion-adjusting arm into a hole and at least one slot in air-communication with the hole, and wherein the hole has a center, a distance between the center and the at least one external elastic arm is defined as a radius, and a distance between the center and the torsion-adjusting arm is defined as an interference distance and is smaller than the radius; and
at least one shaft coupling through the hole of each of the torsion washers and defining a central axis, wherein an outer surface of the at least one shaft has a non-contact surface and a contact surface, a distance between the contact surface and the central axis is substantially equal to the radius, a distance between the non-contact surface and the central axis is smaller than the interference distance, and the contact surface of the at least one shaft contacts the at least one external elastic arm of each of the torsion washers and selectively contacts the torsion-adjusting arm of each of the torsion washers,
wherein the at least one shaft includes a first segment and a second segment, the first segment couples through a part of the torsion washers, the second segment couples through the other part of the torsion washers, and a central angle of the non-contact surface of the first segment is different from that of the second segment.

* * * * *